United States Patent [19]

Schmidt et al.

[11] Patent Number: 5,047,201
[45] Date of Patent: Sep. 10, 1991

[54] SEAL FOR A VESSEL CONNECTION OF A HOT PIPELINE

[75] Inventors: Rainer Schmidt; Helmut David; Ernst Malik, all of Oberhausen, Fed. Rep. of Germany

[73] Assignee: MAN Gutehoffnungshütte AG, Oberhausen, Fed. Rep. of Germany

[21] Appl. No.: 378,082

[22] Filed: Jul. 11, 1989

[30] Foreign Application Priority Data

Jul. 14, 1988 [DE] Fed. Rep. of Germany ....... 3823810

[51] Int. Cl.$^5$ .......................... G21C 13/00; F16L 5/00
[52] U.S. Cl. ................................ 376/204; 376/286; 376/291; 285/47; 138/149
[58] Field of Search ............... 376/285, 286, 291, 292, 376/203, 204; 285/47; 138/148, 149

[56] References Cited

U.S. PATENT DOCUMENTS

| | | | |
|---|---|---|---|
| 4,060,263 | 11/1977 | Kotcharian | 285/47 |
| 4,259,156 | 3/1981 | Neuenfeldt et al. | 376/286 |
| 4,500,487 | 2/1985 | Christie et al. | 376/291 |
| 4,767,593 | 8/1988 | Wedellsborg | 376/286 |

Primary Examiner—Daniel D. Wasil
Attorney, Agent, or Firm—Max Fogiel

[57] ABSTRACT

A hot pipeline is welded to a flange which is supported by brackets connected to a nozzle. The pipeline with a flange can expand freely radially. Welded to the other end of the flange is a pipe, which can withstand an axial temperature gradient between a temperature $T_1$ at the pipeline and flange, and a temperature $t_2$ at a compensator and the nozzle. The axial expansion of pipe is accommodated by the compensator, which is welded to the pipe and at its other end to the nozzle. The pipeline, the flange, the pipe and the compensator are subject to the difference between pressure $p_2$ in the vessel and the pressure $p_1$ in the pipeline.

4 Claims, 3 Drawing Sheets

SEAL FOR A VESSEL CONNECTION OF A HOT PIPELINE

BACKGROUND OF THE INVENTION

The invention concerns the seal between a hot pipeline with a higher wall temperature $t_1$ that extends through a nozzle of a reactor pressure vessel for example with a lower wall temperature $t_2$, whereby the hot pipeline has an inner pressure $p_1$ and is to be sealed off against the pressure $p_2$ in the vessel.

When a hot pipeline extends out of a container that also contains a hot medium and when either the medium in the pipeline or the medium in the container is hotter, the pipe is made of what are called thermosleeves. The pipeline has a special structure where it extends through the container, in that the connection that is to extend out of the container is longer in diameter to accommodate interior insulation in conjunction with a protective pipe, followed by a section of pipe, again with a longer diameter, that extends parallel and in the opposite direction with its end welded to the opening through the container. The intermediate spaces are filled with a heat-insulating medium.

One of the drawbacks of thermosleeves is that the joint between the inner pipe and the container connection must be able to accommodate the stress of the interior pressure, which derives from the temperature difference and the weight of the components.

SUMMARY OF THE INVENTION

The object of the invention is to provide a seal for the connections in a hot pipeline wherein the stress relationships are more beneficial and that will ensure the greatest possible sealing reliability.

The various functions of the seal in accordance with the invention are in a practical way separate. The pipe structure's weight is supported by the connection's brackets. The remainder is stressed only by the difference in pressure and temperature.

BRIEF DESCRIPTION OF THE DRAWINGS

FIG. 1 illustrates a preferred example of a pipe extension, A hot pipeline 1, which has for example a pressure $p_1$ and a temperature $t_1$, extends through a pressure vessel nozzle 4. It is assumed for example that the pressure $p_2$ in the vessel is lower than the pressure $p_1$ in the pipeline.

Figure 1:
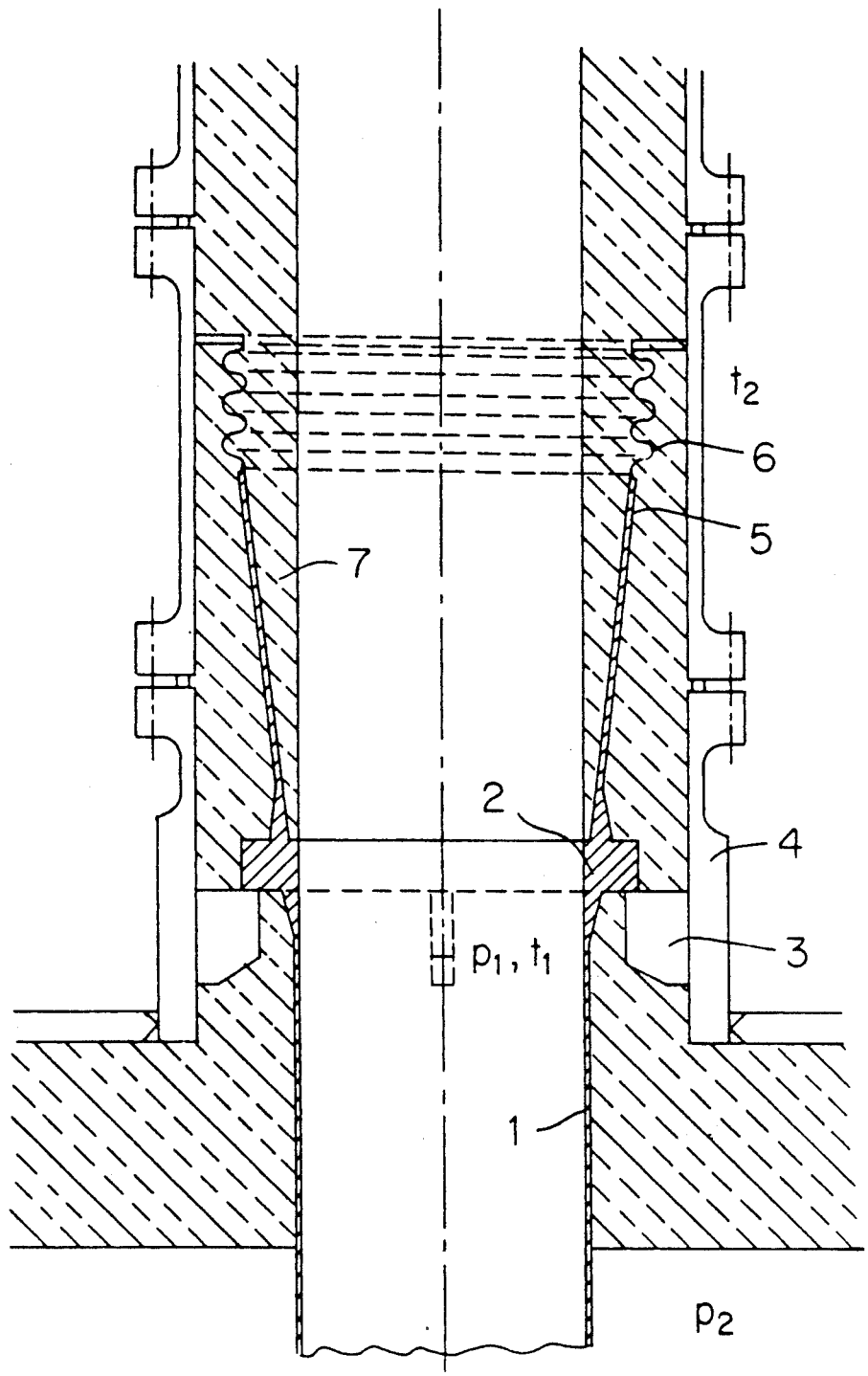
FIG. 1 is a partial sectional view and shows the seal and piping arrangement, in accordance with the present invention.

Pipeline 1 is welded to flange 2, which has conical hubs on both sides. The flange is supported by brackets 3 connected to nozzle 4. The solidity of flange 2 prevents excessive temperature stresses. Pipeline 1 with Flange 2 can expand freely radially. The vicinity of the flange is for this purpose packed with an easily compressive ceramic insulating material. Welded to the conical top of flange 2 is a pipe member 5, conical in this case. The pipe 5 inside the insulation 7 can withstand the difference between pressure $p_1$ and pressure $p_2$ and an axial temperature gradient. This gradient depends on the length of the pipe 5 and the permissible stress, and that is determined by means of known heat-transmission calculations. The greater the difference between temperature $t_1$ and temperature $t_2$ and the lower the strength properties, the longer pipe 5 will have to be.

Figure 3:
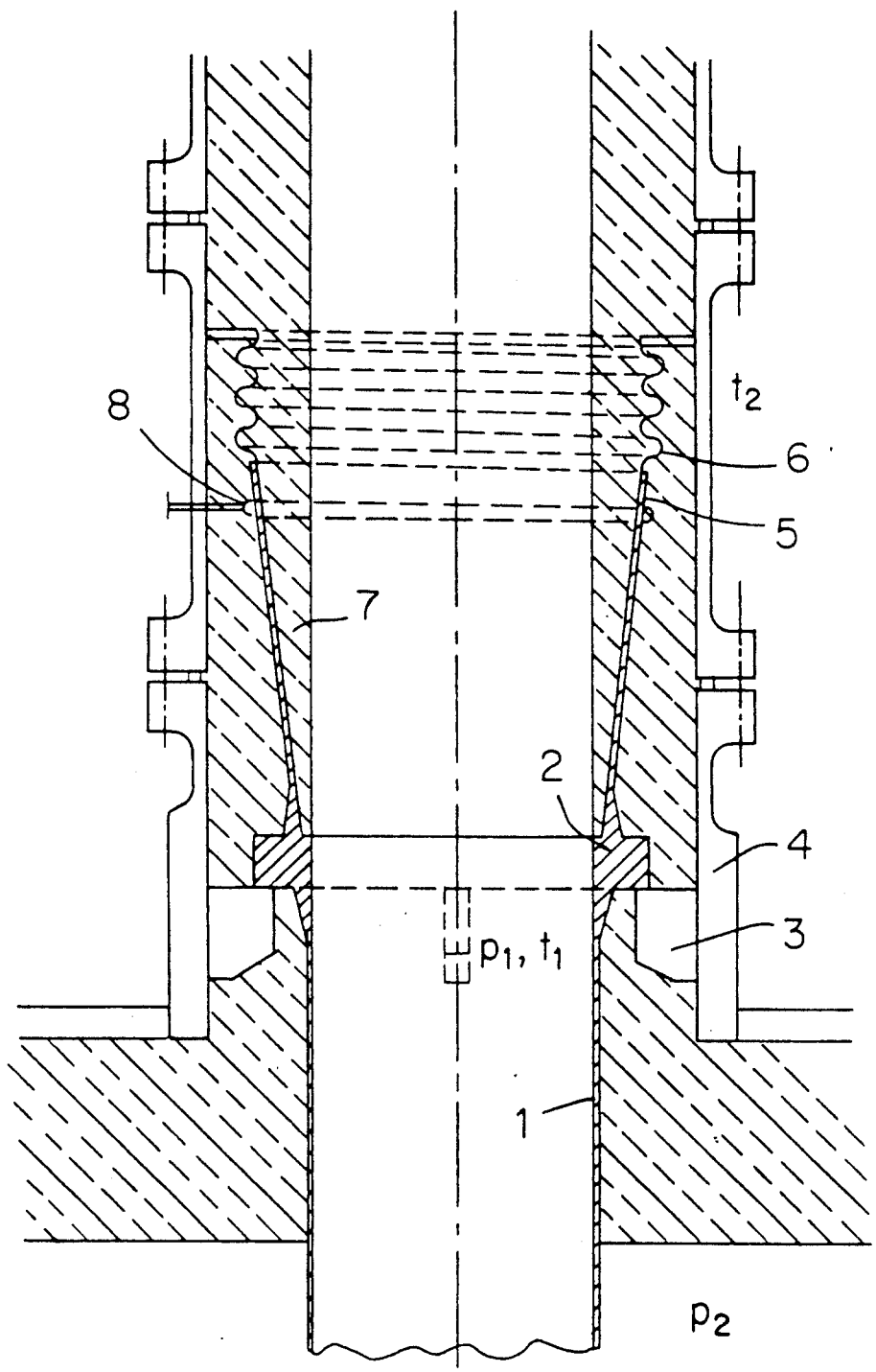
FIG. 3 is a further embodiment of the arrangement of FIG. 1.

FIG. 3 shows the pipe 5 surrounded by an optional duct 8 for cooling of the compensator end of the pipe.

Figure 2:
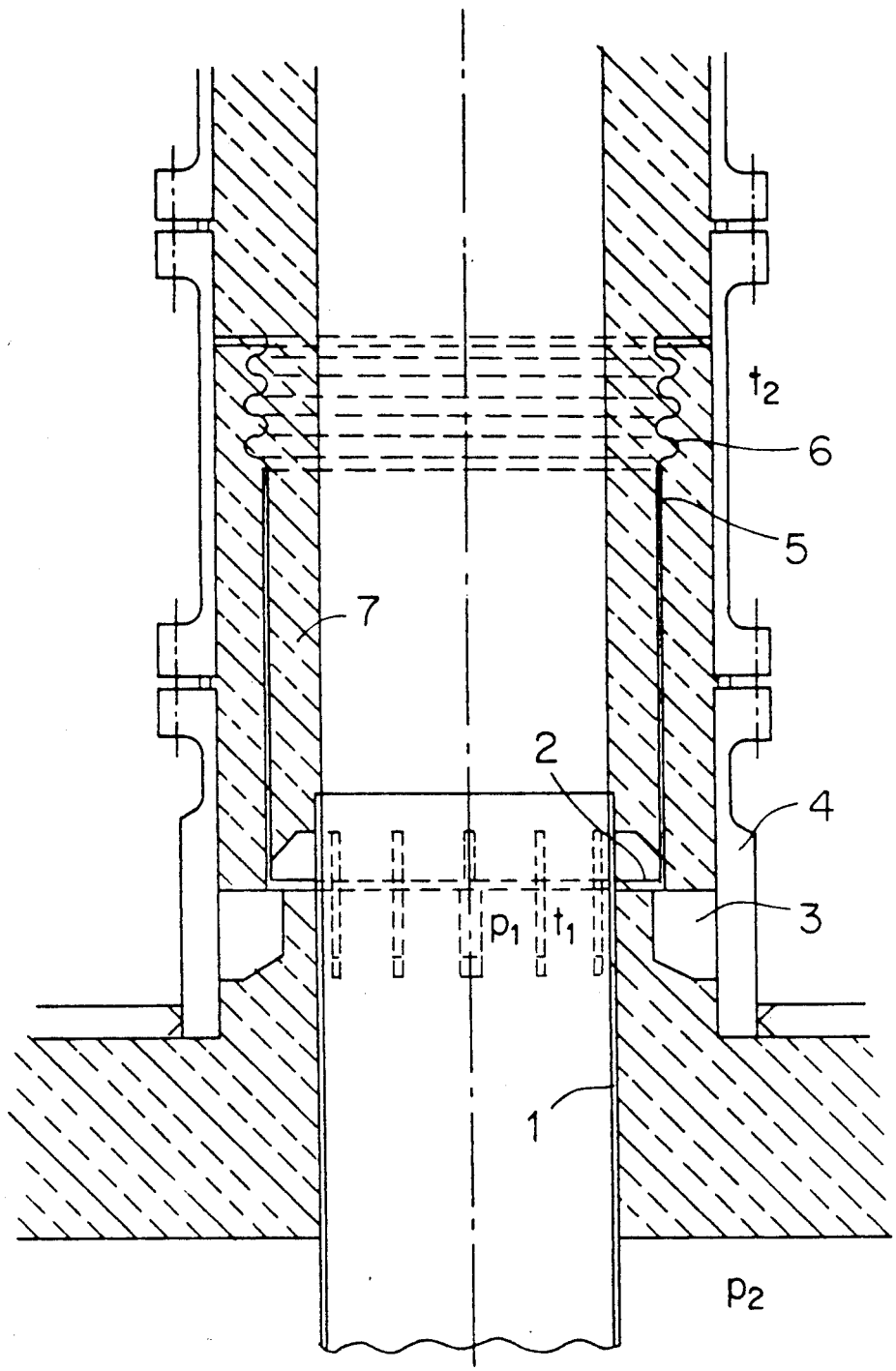
FIG. 2 is a partial sectional view of another embodiment of FIG. 1.

FIG. 2 illustrates another embodiment. Pipeline 1 has a flat flange 2 welded to the pipe. Pressure vessel nozzle 4 has brackets 3 inside it, twelve along its circumference for example. Flange 2 has reinforcing ribs where it rests on the brackets.

Although the pipe member 5 in this embodiment is cylindrical, this is only one alternative to the pipe member 5 illustrated in FIG. 1.

The axial expansion of pipe 5 is accommodated by a compensator 6, which is welded to pipe 5 and at its other end to the nozzle 4 and is also subject to the difference between pressure $p_1$ and pressure $p_2$.

We claim:

1. A nonremovable seal for a hot pipeline extending through a nozzle in a container comprising: a hot pipeline having a wall with a first temperature and extending through a nozzle in a container having a wall with a second temperature, said first temperature being substantially higher than said second temperature, said hot pipeline having an interior first pressure to be sealed off from a second pressure in said container; brackets connected to said nozzle; said hot pipeline having a flange resting on said brackets, said hot pipeline with said flange being able to expand freely radially; a pipe member connected to said flange and having a temperature at the flange equal substantially to said first temperature; said pipe member having an upper end with a temperature substantially equal to said second temperature; insulation around said pipe member; said pipe member and said insulation having a length to enable said pipe member to withstand the difference between said first pressure and said second pressure and the difference between said first temperature and said second temperature; compensator means having one end connected to said pipe member and having another end connected to said nozzle for compensating against axial expansion of said pipe member, said compensator being subjected to the difference between said first pressure and said second pressure.

2. A seal as defined in claim 1, wherein said compensator is welded to said pipe member and to said nozzle.

3. A nonremovable seal for a hot pipeline extending through a nozzle in a container comprising: a hot pipeline having a wall with a first temperature and extending through a nozzle in a container having a wall with a second temperature, said first temperature being substantially higher than said second temperature, said hot pipeline having an interior first pressure to be sealed off from a second pressure in said container; brackets connected to said nozzle; said hot pipeline having a flange resting on said brackets, said hot pipeline with said flange being able to expand freely radially; a pipe member connected to said flange and having a temperature at the flange equal substantially to said first temperature; said pipe member having an upper end with a temperature substantially equal to said second temperature; insulation around said pipe member; said pipe member and said insulation having a length to enable said pipe member to withstand the difference between said first pressure and said second pressure and the difference between said first temperature and said second temperature; compensator means having one end connected to said pipe member and having another end connected to said nozzle for compensating against axial expansion of said pipe member, said compensator being subjected to the difference between said first pressure and said second pressure; and cooling means surrounding said pipe member for cooling said pipe member at said one end of said compensator means, said cooling means also enabling said pipe member to withstand the difference between said first pressure and said second pressure and the difference between said first temperature and said second temperature.

4. A seal as defined in claim 3, wherein said compensator is welded to said pipe member and to said nozzle.

* * * * *